United States Patent
Lund

(10) Patent No.: US 11,683,450 B2
(45) Date of Patent: Jun. 20, 2023

(54) SHUTTER AND LIGHT SIGNAL SYNCHRONIZATION SYSTEMS AND METHODS

(71) Applicant: FLIR Unmanned Aerial Systems AS, Hvalstad (NO)

(72) Inventor: Jon Elvira Andres Lund, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 38 days.

(21) Appl. No.: 17/336,255

(22) Filed: Jun. 1, 2021

(65) Prior Publication Data
US 2021/0385414 A1    Dec. 9, 2021

Related U.S. Application Data

(60) Provisional application No. 63/034,914, filed on Jun. 4, 2020.

(51) Int. Cl.
*H04N 7/18* (2006.01)
*H04B 10/116* (2013.01)
*G06V 20/10* (2022.01)

(52) U.S. Cl.
CPC .............. *H04N 7/18* (2013.01); *G06V 20/10* (2022.01); *H04B 10/116* (2013.01)

(58) Field of Classification Search
None
See application file for complete search history.

(56) References Cited

U.S. PATENT DOCUMENTS

| | | | | |
|---|---|---|---|---|
| 6,661,542 | B1 * | 12/2003 | Mangerson | H04N 1/00129 358/484 |
| 8,825,187 | B1 * | 9/2014 | Hamrick | H04S 7/304 700/94 |
| 9,223,786 | B1 * | 12/2015 | Hamrick | G06F 16/4393 |
| 9,564,966 | B1 * | 2/2017 | Breuer | H04W 4/023 |
| 10,542,221 | B2 * | 1/2020 | Stout | H04N 25/75 |
| 10,567,744 | B1 * | 2/2020 | Giguere | G02B 27/0172 |
| 11,025,892 | B1 * | 6/2021 | Aman | H04N 21/458 |
| 11,140,334 | B1 * | 10/2021 | Lu | H04N 23/74 |

(Continued)

FOREIGN PATENT DOCUMENTS

| | | | | |
|---|---|---|---|---|
| CN | 202587241 U | * | 12/2012 | H04B 10/116 |
| CN | 111432259 A | * | 7/2020 | G05B 19/418 |

OTHER PUBLICATIONS

Hambling, David, "Strobe Weapons Go Black After 'Immobilization' Tests (Updated)", dated Mar. 3, 2009, 3 pages; https://www.wired.com/2009/03/strobe-weapons/.

*Primary Examiner* — Reza Aghevli
(74) *Attorney, Agent, or Firm* — Haynes and Boone, LLP

(57) ABSTRACT

Techniques for facilitating shutter and light signal synchronization systems and methods are provided. In one example, a system includes a vehicle. The vehicle includes a light emitting device configured to emit a light signal. The vehicle further includes a logic device configured to transmit data associated with the light signal. The system further includes a wearable apparatus. The wearable apparatus includes a shutter device configured to synchronize with the light signal based on the data and process the light signal according to the synchronization. Related methods and devices are also provided.

20 Claims, 5 Drawing Sheets

(56) References Cited

U.S. PATENT DOCUMENTS

| | | | |
|---|---|---|---|
| 2008/0044063 A1* | 2/2008 | Friedman | A61B 3/1216 382/117 |
| 2012/0050233 A1* | 3/2012 | Choi | G09G 3/3225 345/204 |
| 2014/0218520 A1* | 8/2014 | Teich | H04N 23/74 348/165 |
| 2014/0226058 A1* | 8/2014 | Muraki | H04N 23/665 348/362 |
| 2015/0015482 A1* | 1/2015 | Njolstad | G06F 3/03542 345/156 |
| 2015/0085133 A1* | 3/2015 | Teich | H04N 7/18 348/159 |
| 2015/0156461 A1* | 6/2015 | Jessop | H04N 13/246 348/47 |
| 2015/0173846 A1* | 6/2015 | Schneider | A61B 1/000095 600/424 |
| 2015/0195508 A1* | 7/2015 | Pavol | H04N 13/271 348/46 |
| 2016/0095504 A1* | 4/2016 | Ushijima | A61B 1/00193 600/111 |
| 2017/0013308 A1* | 1/2017 | Alvarez | H04N 21/44 |
| 2017/0195046 A1* | 7/2017 | Cheon | H04L 12/2809 |
| 2017/0373752 A1* | 12/2017 | Rains | H04N 23/65 |
| 2018/0063522 A1* | 3/2018 | Cichonski | H04N 13/341 |
| 2018/0130209 A1* | 5/2018 | Price | G02B 27/017 |
| 2018/0234496 A1* | 8/2018 | Ratias | A63F 13/60 |
| 2019/0215654 A1* | 7/2019 | Engelen | H05B 45/10 |
| 2020/0213498 A1* | 7/2020 | Broers | H04N 23/90 |
| 2020/0382212 A1* | 12/2020 | Engelen | H05B 47/195 |
| 2021/0192754 A1* | 6/2021 | Sibley | A01C 15/00 |
| 2021/0195075 A1* | 6/2021 | Lundberg | H04N 23/56 |
| 2021/0227120 A1* | 7/2021 | Otten | H04N 23/56 |
| 2021/0299706 A1* | 9/2021 | Filler | H04N 23/56 |
| 2021/0304395 A1* | 9/2021 | Subramanian | G06V 20/13 |
| 2021/0409678 A1* | 12/2021 | Birklbauer | H04B 10/116 |

* cited by examiner

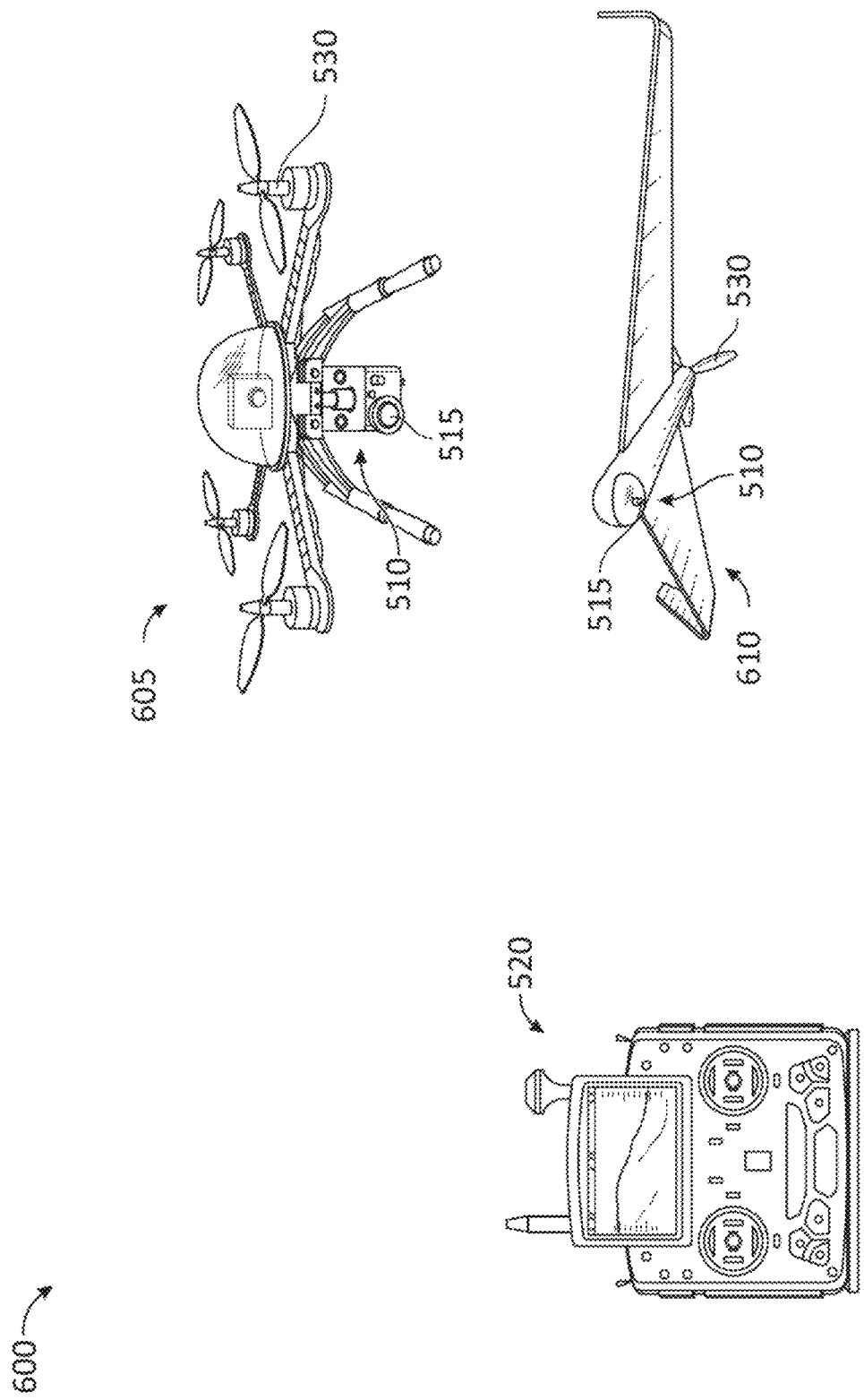

SHUTTER AND LIGHT SIGNAL SYNCHRONIZATION SYSTEMS AND METHODS

CROSS-REFERENCE TO RELATED APPLICATIONS

This patent application claims priority to and the benefit of U.S. Provisional Patent Application No. 63/034,914 filed Jun. 4, 2020 and entitled "SHUTTER AND LIGHT SIGNAL SYNCHRONIZATION SYSTEMS AND METHODS" which is hereby incorporated by reference in its entirety.

TECHNICAL FIELD

One or more embodiments relate generally to shutters and light emitters and more particularly, for example, to shutter and light signal synchronization systems and methods.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. In particular, UAVs have a wide range of real-world applications including surveillance, reconnaissance, exploration, item transportation, disaster relief, aerial photography, large-scale agriculture monitoring, etc. A UAV may generally be equipped with various devices such as sensors and navigation technologies to complete a broad variety of operations.

SUMMARY

In one or more embodiments, a system includes a vehicle. The vehicle includes a light emitting device configured to emit a light signal. The vehicle further includes a logic device configured to transmit data associated with the light signal. The system further includes a wearable apparatus. The wearable apparatus includes a shutter device configured to synchronize with the light signal based on the data and process the light signal according to the synchronization.

In one or more embodiments, a method includes transmitting, by a logic device of a vehicle, data associated with a light signal to a wearable apparatus. The method further includes synchronizing a shutter device of the wearable apparatus with the light signal. The method further includes emitting, by a light emitting device of the vehicle, the light signal. The method further includes processing, by the shutter device, the light signal according to the synchronizing.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 6 illustrates a diagram of a survey system in accordance with one or more embodiments of the present disclosure Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Figure 1:
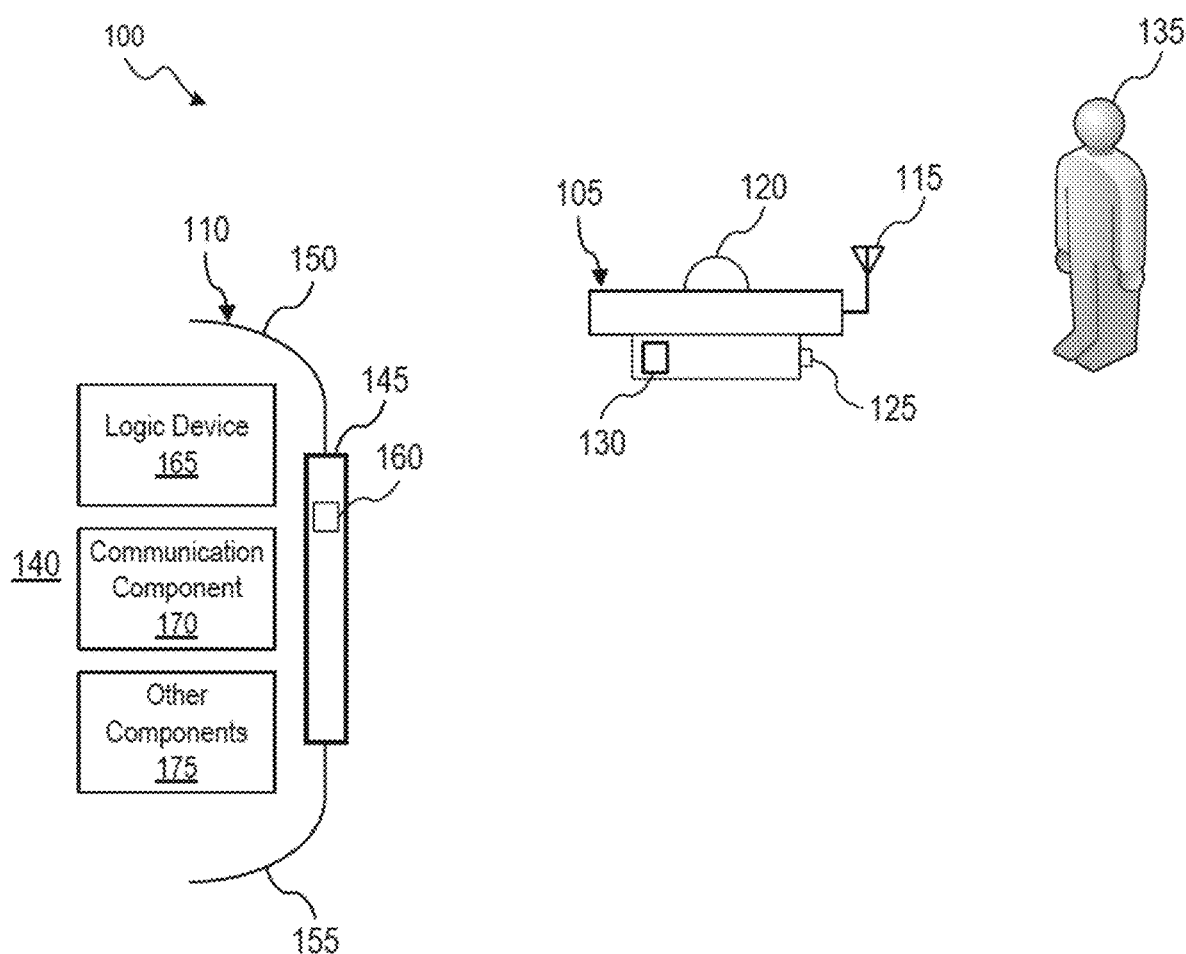
FIG. 1 illustrates an example environment in which shutter and light signal synchronization may be implemented in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate shutter and light signal synchronization systems and methods. In some embodiments, operations of a vehicle may be synchronized with operations of a wearable apparatus. The vehicle may include a light emitting device and a logic device. The light emitting device may emit a light signal and the logic device may transmit data associated with the light signal. In some aspects, the light emitting device may include a strobe light that emits flashes of light. The wearable apparatus may include a shutter device that is operated based on the data. The shutter device may be operated to process (e.g., pass, filter out) the flashes of light for a wearer (e.g., also referred to in some cases as an operator or a user) of the wearable apparatus. The data may synchronize/coordinate operation of the shutter device of the wearable apparatus to/with operation of the light emitting device of the vehicle such that the shutter device can use the data to facilitate processing of the light signal emitted by the light emitting device. As such, the data may be referred to as a synchronization signal. Such synchronization/coordination between operation of the shutter device and the light emitting device is in association with the light signal. The vehicle may transmit (e.g., wireless transmit) the data to the wearable apparatus. In some aspects, the wearable apparatus may be a head-mounted device that can be worn by a user. In some cases, the head-mounted device may be an augmented-reality headset.

In some aspects, processing of the light signal may include blocking the light signal to attenuate or eliminate the light signal. For example, in some cases, the shutter device selectively opens or closes based on the data. In this regard, the shutter device can selectively open or close when the light signal is emitted by the light emitting device. As one example, the light emitting device may emit a light signal to disorient a target (e.g., an intruder), and the shutter device may be closed when the light signal is emitted to allow the wearer of the wearable apparatus to avoid being disoriented (e.g., avoid being blinded or otherwise visually impaired) by the emitted light signal. In some cases, the wearer may observe the scene using other means, such as night vision (e.g., infrared wavelengths), when the shutter device blocks the scene (e.g., blocks visible-light) from the wearer. As another example, the light emitting device may emit the light signal to scout a path forward, and the shutter device may be open when the light signal is emitted to allow a wearer of the wearable apparatus to view the path and follow the vehicle.

In some embodiments, such shutter and light signal synchronization systems and methods may be used in various applications, such as surveillance applications and safety enforcement applications. Synchronization of the light emitting device of the vehicle and the shutter device of the wearable device may allow disorientation of a target (e.g., a trespasser in an area) using a light signal from the light emitting device while protecting a person wearing the wearable device from the light signal. For example, the person's eyesight may be protected from the light signal and the person's position may remain unknown to the target relative to a case in which the person is holding and operating the light emitting device to disorient the target. For some applications, while the target is disoriented, the wearer of the wearable apparatus and/or others may have time to evaluate a level of threat associated with the target and determine how to handle the target.

Although the vehicle is described and depicted as being an aerial vehicle (e.g., UAV) in various embodiments of the present disclosure, the vehicle may, alternatively or in addition, be a terrestrial vehicle, a naval vehicle, and/or other type of vehicle. In this regard, the various embodiments may be used for terrestrial vehicles (e.g., terrestrial drones), naval vehicles, aerial vehicles, or generally any vehicle for which operation of the vehicle may be synchronized with operation of a shutter device. In some cases, the vehicles may be unmanned/autonomous vehicles (e.g., unmanned cars, UAVs) that can be manually controlled to effectuate manual take-over (e.g., via a remote control device) when desired or needed.

Various embodiments of methods and systems disclosed herein may be included in or implemented as various devices and systems such as visible-light imaging systems, infrared imaging systems, imaging systems having visible-light and infrared imaging capability, mobile digital cameras, video surveillance systems, video processing systems, or other systems or devices that may need to obtain image data in one or multiple portions of the electromagnetic (EM) spectrum.

Referring now to the drawings, FIG. 1 illustrates an example environment 100 in which shutter and light signal synchronization may be implemented in accordance with one or more embodiments of the present disclosure. Not all of the depicted components may be required, however, and one or more embodiments may include additional components not shown in FIG. 1. Variations in the arrangement and type of the components may be made without departing from the spirit or scope of the claims as set forth herein. Additional, fewer, and/or different components may be provided.

An aerial vehicle 105 and a wearable apparatus 110 are in the environment 100. The aerial vehicle 105 includes an antenna 115, a light emitting device 120, an imaging device 125, and a logic device 130. The antenna 115 may communicate (e.g., wirelessly communicate) with the wearable apparatus 110 (e.g., an antenna of the wearable apparatus 110). The antenna 115 may include an omnidirectional antenna or a directional antenna. An omnidirectional antenna may be utilized to radiate and/or receive power uniformly in all directions. A directional antenna may be utilized to radiate and/or receive power from a desired direction (e.g., a direction of the wearable apparatus 110 relative to the antenna 115) to allow increased performance (e.g., higher signal strength) in the desired direction, such as through higher gain and directivity and reduced interference due to signals from sources deviating from the desired direction. The antenna 115 may be contained within a housing of the aerial vehicle 105, or disposed (e.g., mounted) outside a housing of the aerial vehicle 105. In some cases, the antenna 115 may be movable along and/or rotatable about one, two, or three axes. In other cases, the antenna 115 may be fixed (e.g., not movable and not rotatable). In an aspect, the aerial vehicle 105 may include multiple antennas, which may include one or more directional antennas and/or one or more omnidirectional antennas.

The light emitting device 120 may emit a light signal. A light signal may include a sequence of light pulses (e.g., flashes). In an embodiment, the light emitting device 120 may transmit the light signal to disorient (e.g., temporarily blind) a target 135. Depending on applications, the light signal may have visible-light wavelengths (e.g., viewable by human eyes) or more covert wavelengths, such as infrared wavelengths (e.g., mid-wave infrared wavelengths). In some cases, the light signal may be visible-light to temporarily blind the eyes of the target 135. As one example, the light emitting device 120 may be a broad spectrum emitter that emits a variety of wavelengths in the visible-light spectrum, such as to provide white light. Other applications may use a more narrow spectrum of wavelengths to flash within a specific color, such as a certain color of light (e.g., blue light) representative of a type of first responder (e.g., police). In some cases, the light emitting device 120 may be a single wavelength light source, such as a laser. In some cases, alternatively or in addition to transmitting visible-light, the light emitting device 120 may emit infrared light such that the flashes are invisible to the target 135 (e.g., while visible to a night vision sensor to facilitate detection of the target 135) and/or to affect (e.g., blind) any night vision associated with the target 135. In an embodiment, the light emitting device 120 may be a strobe light. Although the target 135 is depicted as a person, the target 135 may be a device (e.g., unmanned drone, robot, etc.). For example, a sensor(s) and/or other component of such a device may be damaged (e.g., saturated) by the light signal.

In some cases, the aerial vehicle 105 may fly (e.g., autonomously fly) into a field of view of the target 135 before emitting a light signal (e.g., to maximize a blinding effect), position itself between the target 135 and a user 140 to protect the user 140 and/or to minimize light directed at the user 140, and/or maneuver to draw attention away from the user 140. In some aspects, movement of the aerial vehicle 105 prior to emitting the light signal may be based on user preferences, an application for which the aerial vehicle 105 is employed, a situation the aerial vehicle 105 and/or the user 140 is in (e.g., as determined/detected autonomously by the aerial vehicle 105 and/or based on input from the user 140 and/or other people), and/or other considerations. In some aspects, the light emitting device 120 may be turned off most of the time to avoid potential targets adapting to light signals emittable by the light emitting device 120 and/or to avoid unnecessarily revealing a position of the light emitting device 120.

The imaging device 125 may capture an image associated with a scene. In some cases, the imaging device 125 may be an electro-optical/infrared (EO/IR) camera. An image may be captured during motion of the aerial vehicle 105 and/or while the aerial vehicle 105 is stationary. In an embodiment, the imaging device 125 may include an image detector circuit and a readout circuit (e.g., a readout integrated circuit (ROIC)). In some aspects, the image detector circuit may capture (e.g., detect, sense) visible-light radiation and/or infrared radiation. The imaging device 125 may be movable or fixed. A field of view of the imaging device 125 may be adjusted (e.g., by the user 140 and/or by one or more actuators) by moving and/or rotating the imaging device 125, adjusting pan, tilt, and/or zoom parameters of the imaging device 125, moving and/or rotating the aerial vehicle 105, and/or other manners.

To capture an image, the image detector circuit may detect image data (e.g., in the form of EM radiation) associated with the scene and generate pixel values of the image based on the image data. In some cases, the image detector circuit may include an array of detectors that can detect EM radiation, convert the detected EM radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting example, each detector may be a photodetector, such as an avalanche photodiode, an infrared photodetector, a quantum well infrared photodetector, a microbolometer, or other detector capable of converting EM radiation (e.g., of a certain wavelength) to a pixel value.

The logic device 130 may generate a control signal and provide the control signal to the light emitting device 120 to cause the light emitting device 120 to emit a light signal. The control signal may indicate to the light emitting device 120 characteristics of the light signal to be emitted by the light emitting device 120. The logic device 130 may also generate data associated with the light signal to be emitted by the light emitting device 120 and transmit the data (e.g., using the antenna 115) to the wearable apparatus 110. The data may include characteristics of the light signal to be emitted by the light emitting device 120. In some cases, the data may include the same or similar information as the control signal provided to the light emitting device 120. In some cases, the data generated by the logic device 130 may be provided as the control signal to the light emitting device 120 to cause the light emitting device 120 to emit the light signal. In an aspect, each of the control signal and the data, which may be the same signal or may contain the same or similar information, may be referred to as a synchronization signal, synchronization data, a timing signal, or timing data. As one example, the data may allow a shutter device 160 of the wearable apparatus 110 to process (e.g., block, filter including filter out in some cases) the light signal such that the user 140 of the wearable apparatus 110 is not blinded or otherwise visually impaired by the light signal. As another example, the data may allow the shutter device 160 of the wearable apparatus 110 to process (e.g., amplify, pass) the light signal such that the user 140 of the wearable apparatus 110 can better see a scene illuminated by the light signal, such as when the light emitting device 120 is used to scout a path ahead. In this regard, such data synchronizes the light emitting device 120 to the shutter device 160 of the wearable apparatus 110. Whether the shutter device 160 is operated to effectively close (e.g., block) or effective open (e.g., pass, amplify) in relation to the light signal emitted by the light emitting device 120 depends on an application the aerial vehicle 105 and/or the wearable apparatus 110 are being utilized for.

By way of non-limiting examples, a light signal emitted by the light emitting device 120 may be characterized by a time interval between any two pulses of the light signal, a time duration of each pulse, a light intensity of each pulse, and/or a wavelength of each pulse. In the case that the light emitting device 120 is a strobe light, light emitted by the strobe light may be characterized a time interval between flashes, a time duration of each flash, and a light intensity of each flash.

In some cases, each pulse of the light signal is at the same wavelength. In some cases, pulses of the light signal from the light emitting device 120 may have a constant pulse repetition rate (e.g., also referred to as a pulse frequency), in which a pulse is periodically provided by the light emitting device 120 in accordance with a constant frequency (e.g., duration between temporally adjacent pulses of a light signal remains constant or substantially constant). In other cases, pulses of the light signal do not have a constant pulse repetition rate, such that a duration between two temporally adjacent pulses of the light signal need not be the same as a corresponding duration between another two temporally adjacent pulses. As an example, in a case of a pulse sequence with a first light pulse temporally adjacent to a second light pulse and the second light pulse temporally adjacent to a third light pulse, a time between the first light pulse and the second light pulse of the pulse sequence emitted by the light emitting device 120 may be different from a time between the second light pulse and the third light pulse of the pulse sequence emitted by the light emitting device 120.

As one example application, the light emitting device 120 may be used to emit a light signal to disorient the target 135. In some cases, a pulse frequency to disorient the target 135 may be between 1 Hz and 20 Hz. For a human target, the human eyes, in general, may have time to adjust between flashes having a pulse frequency much lower/slower than 1 Hz and cannot perceive flashes having a pulse frequency much higher/faster than 20 Hz (e.g., the flashes may effectively be perceived as constant light). A duration of a pulse may depend on a configuration of the shutter device 160 on the receiving end. The duration of a pulse and/or other parameters may be varied depending on the ambient light, sensitivity of a sensor (e.g., sensing device and/or human eyes) behind the shutter device 160, and/or other factors. In some cases, having a non-constant duration (e.g., a randomized duration) between any two temporally adjacent pulses/flashes of the light signal may make it more difficult for a target (who ideally is unable to receive, process, and/or decode the synchronization signal) from predicting a next flash of the light signal. This would make it harder for a target to create a device that can filter out a flash by predicting when the flash will occur or otherwise adapt to the light signal. Similarly, each of the pulses may have a different/varied pulse duration to make it more difficult for the target to mitigate or adapt to the light signal.

Each characteristic of a light signal emitted by the light emitting device 120 may be varied and communicated (e.g., over radio) for synchronization with the wearable apparatus 110. In some embodiments, varying the characteristics of the light signal and synching the wearable apparatus 110 with these characteristics may make it difficult for the target 135 and/or a device carried or worn by the target 135 to synchronize with the light signal without access to (e.g., without capability to receive, process, decode, etc.) the synchronization signal.

In an embodiment, images captured by the image detector circuit of the imaging device 125 may be processed to determine whether an object in the scene is a target (e.g., a threat). Such processing may include object detection and/or facial recognition. The imaging device 125 may transmit the captured images to the logic device 130, the wearable apparatus 110, and/or processing circuit remote from the aerial vehicle 105 and/or the wearable apparatus 110 for processing. The logic device 130 may generate the control signal in response to a target being detected in an image. In some aspects, the logic device 130 may generate the control signal autonomously and/or the light emitting device 120 may emit the light autonomously in response to the control signal from the logic device 130. In other aspects, the logic device 130 may request input from the user 140 on whether to emit a light signal at the target 135 in response to the target 135 being detected in an image. For example, the logic device 130 and/or other device may provide the image that includes the target 135 to the user 140. The user 140 may instruct the logic device 130 to cause the light emitting device 120 to emit or not emit a light signal at the target 135.

The logic device 130, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The logic device 130 may be configured to interface and communicate with the various other components (e.g., 115, 120, 125, etc.) of the aerial vehicle 105 to perform such operations.

It is noted that the imaging device 125 is provided as a non-limiting example of an onboard sensor device of the aerial vehicle 105. In some cases, other types of onboard sensor devices (e.g., radar devices, sonar devices, proximity sensors) may be used to detect potential targets. Although the aerial vehicle 105 is depicted with a single onboard sensor device (e.g., the imaging device 125), the aerial vehicle 105 may be mounted with multiple onboard sensor devices of the same type (e.g., multiple cameras) or different types (e.g., camera(s), radar(s), sonar(s)). In some aspects, the aerial vehicle 105 may include an audio device(s) (e.g., a speaker(s)) that emits an audio signal(s). In some cases, the audio signal(s) may be emitted in addition to the light emitted by the light emitting device 120 to further disorient the target 135.

The wearable apparatus 110 protects at least a portion of the user 140 from an environment external to the wearable apparatus 110 when the wearable apparatus 110 is worn by the user 140, including protecting the user 140 from light signals emitted by the light emitting device 120. The wearable apparatus 110 includes a shield 145 and structural members 150 and 155. The shield 145 may protect at least a portion of a face of the user 140 from the external environment when the wearable apparatus 110 is worn by the user 140.

The shield 145 may pass visible light so that the user 140 can view the external environment through the shield 145. The structural members 150 and 155 may partially or completely enclose a face, head, or any desired portion of the user 140 (e.g., including the entirety of the user 140 if desired based on application). The shield 145 and the structural members 150 and 155 collectively provide protection to at least a portion of the user 140 as appropriate for a given application. By way of non-limiting examples, the shield 145 may be made of polymers (e.g., polycarbonate), metal, or any other appropriate materials durable enough for the given application. In some cases, the shield 145 may be sufficient to provide a protective barrier against heat, intensive light rays, debris, and/or other harmful elements from the external environment. In some cases, the shield 145 may include or may be coated with one or more appropriate protective layers to enhance or provide protection against such harmful elements.

Although the shield 145 and the structural members 150 and 155 are illustrated in FIG. 1 as having a certain shape (e.g., curvature) and size, the shield 145 and the structural members 150 and 155 may be implemented with any desired shape and size to provide appropriate protection and functionality to the user 140 for a desired application(s). The wearable apparatus 110 may include other hardware, such as a mask frame, a hood, straps, fasteners, harnesses, connectors, hoses, and other various hardware and protective equipment and clothing as may be desired for certain applications of the wearable apparatus 110. It is noted that the wearable apparatus 110 may be implemented as any type of wearable device, equipment, glasses, googles, gear, mask, helmet, garment, and/or clothing that includes the shield 145 to protect at least a portion of a face of the user 140 from the external environment.

The wearable apparatus 110 also includes the shutter device 160, a logic device 165, and a communication component 170. Although the logic device 165, the communication component 170, and the other components 175 are depicted as being behind the shield 145, one or more of these components (or portions thereof) may be coupled in front of the shield 145. The shutter device 160 may be used to selectively process light from the scene. Light may be processed by being filtered (e.g., passed, blocked, attenuated) by the shutter device 160. In some applications, the light signal is processed to mitigate the light signal such that the light signal does not visually impair the user 140. As non-limiting examples, the shutter device 160 may include an electronically controlled mechanical shutter or an optical coating.

In an embodiment, the shutter device 160 may be controlled by a control signal from the logic device 165 to selectively open or close the shutter device 160. In response to the control signal, the shutter device 160 may open to allow light to pass from the scene through the shutter device 160 to the user 140, or close to block at least a portion of the scene, such as a portion of the scene that includes a light signal emitted by the light emitting device 120, from the user 140. In some aspects, the shutter device 160 may be referred to as being open or closed by filtering the light signal emitted by the light emitting device 120. For example, to effectively close the shutter device 160, the shutter device 160 can act as a filter to attenuate signals of a certain wavelength range and/or a certain intensity level. To effectively open the shutter device 160, the shutter device 160 can act as a filter to pass or amplify the light signal emitted by the light emitting device 120 and received by the shutter device 160. In one case, the shutter device 160 may filter out a bright scene to preserve a dark-adaptation. In another case, the shutter device 160 may filter out a dark scene to see the details in a brightly lit room (or a dimmed version thereof).

As one example, the shutter device 160 can be open when the light emitting device 120 is emitting light (e.g., the flash is on) and closed when the light emitting device 120 is not emitting light (e.g., the flash is off). In this example, the user 140 may see the scene as illuminated by the light emitting device 120, without dark periods that cause confusion. One example application of such a mode may be when the aerial device 105 is constantly scouting a path ahead.

As another example, the shutter device 160 can be closed when the light emitting device 120 is emitting light (e.g., the flash is on) and open when the light emitting device 120 is not emitting light (e.g., the flash is off). In this case, the user 140 does not see the light signal from the light emitting device 120 and the scene is dark to the user 140. Such a mode may be used in conjunction with night vision and may avoid disturbing a current light-adaptation of the user 140. This mode may for example be used when flashing is normally switched off for the aerial device 105 to remain undetected, and is only turned on for maximum disorientation in a shorter time period.

As another example, the shutter device 160 may be open only during parts of the flash for some applications. The shutter device 160 may be operated in such a manner to adjust an exposure time on a sensor without modifying a pulse length of the flash (e.g., requires a global shutter sensor) for example.

The shutter device 160 may be provided at least at an eye level of the user 140. In some cases, the shutter device 160 may form a part of the shield 145. In one example, an entirety of the shield 145 may provide the shutter device 160. In some cases, the shutter device 160 may be disposed on and in front of the shield 145, such that the shutter device 160 faces the external environment and is farther from the user 140 than the shield 145. In some cases, the shutter device 160 may be disposed on and behind the shield 145, such that the shutter device 160 faces the user 140 and is closer to the user 140 than the shield 145. In some cases, the shutter device 160 is substantially coplanar with the shield 145. For example, the shield 145 may have a hole/slot within which to position the shutter device 160. In this example, the shutter device 160 may be formed as a separate component surrounded by the shield 145. The shutter device 160 may be formed separately from the shield 145 and then combined with the shield 145, formed of a different material and/or manufacturing process relative to the shield 145, and/or others. The shutter device 160 may be larger, smaller, and/or arranged differently from that shown in FIG. 1.

In some aspects, accurate time synchronization (e.g., in the order of 10 μs to 100 μs) may be needed between involved devices, such as time synchronization between the light emitting device 120 of the aerial vehicle 105 and the logic device 165 of the wearable apparatus 110. In such aspects, an accurate measurement of clock offset and drift over radio may be performed. Alternatively or in addition, a sensor with a high sampling rate may be used to detect increases in light intensity and use that rising flank as a common timing reference. Once clock synchronization is achieved, the aerial device 105 may send out a message (e.g., an encrypted message) containing a start time and duration of a next flash of a light signal. In various cases, any arrival delay of this message may be mitigated since the clocks are synchronized. For example, the message can be sent earlier such that the message arrives early enough for the shutter device 160 to open or close in time.

Time synchronization techniques utilized may depend on size, weight, and/or other considerations associated with the aerial device 105 and/or the wearable apparatus 110, as some techniques may employ additional sensors. In some cases, access to a radio-hardware may be used to perform clock synchronization. In some cases, time synchronization may be based on wireless communication signals (e.g., tightly timed wireless communication signals). In some cases, a flank of a flash turning on or off may be used as a common synchronization reference, which may involve use of an extra sensor.

The logic device 165, according to various embodiments, includes one or more of a processor, a microprocessor, a CPU, a GPU, a single-core processor, a multi-core processor, a microcontroller, a PLD (e.g., FPGA), an ASIC, a DSP device, or other logic device that may be configured, by hardwiring, executing software instructions, or a combination of both, to perform various operations discussed herein for embodiments of the disclosure. The logic device 165 may be configured to interface and communicate with the various other components (e.g., 160, 170, 175, etc.) of the wearable apparatus 110 to perform such operations.

The communication component 170 may handle communication between various components of the wearable apparatus 110. For example, components such as the logic device 165 and the shutter device 160 may transmit data to and/or receive data from each other via the communication component 170. The communication component 170 may receive data (e.g., a synchronization signal) from the aerial vehicle 105 and transmit (e.g., forward via a data bus) the data to the logic device 165. The data includes one or more times at which a light pulse is to be transmitted by the light emitting device 120, a duration of each light pulse, and/or other information associated with light emission by the light emitting device 120. The logic device 165 may generate control signals for the shutter device 160 based on the data, such that, for example in some applications, the shutter device 160 may be closed (e.g., effectively closed) to protect the user 140 (e.g., eyesight of the user 140) when light is emitted by the light emitting device 120.

The communication component 170 may facilitate wired and/or wireless connections and may include an antenna(s) and/or wire(s). By way of non-limiting examples, such connections may be provided using inter-chip connections, intra-chip connections, proprietary RF links, and/or standard wireless communication protocols (e.g., IEEE 802.11 WiFi standards, and Bluetooth™) between the various components. In some aspects, the communication component 170 may also handle communication with devices external to the wearable apparatus 110. For example, the communication component 170 may transmit and receive images to and from other wearable apparatuses, a monitoring station so that images can be shared with other users, and/or other devices. The communication component 170 may communicate with other components of the wearable apparatus 110, such as the logic device 165 and other components 175, as well as other devices, such as the aerial vehicle 105, other aerial vehicles, other wearable apparatuses (e.g., users of different wearable apparatuses), and/or other devices. Further in this regard, although the environment 100 of FIG. 1 includes one aerial vehicle and one wearable apparatus, in some embodiments multiple aerial devices and multiple wearable apparatuses (e.g., head-mounted devices) may be connected to share a common synchronization signal. In one case, for example, two or more aerial devices may be used to surround a target and emit light to disorient the target.

Communication in such networks may be based on one or more wireless communication technologies, such as Wi-Fi (IEEE 802.11ac, 802.11ad, etc.), cellular (3G, 4G, 5G, etc.), Bluetooth™, etc. and/or one or more wired communication technologies, such as Ethernet, Universal Serial Bus (USB), etc. In some cases, various aerial vehicles, wearable apparatuses, cameras, sensors, and/or other devices may communicate via a wired network(s) and/or a wireless network (s). The network(s) may include a local area network (LAN), a wide area network (WAN), an Intranet, or a network of networks (e.g., the Internet). In some cases, the aerial vehicle 105 and/or the wearable apparatus 110 may include an internal or external global positioning system (GP S) device to provide location (e.g., latitude, longitude, and/or altitude) and timing services.

The other components 175 of the wearable apparatus 110 may be used to implement any features of the wearable apparatus 110 as may be desired for various applications. By way of non-limiting examples, the other components 175 may include a memory, various sensors (e.g., motion sensor), a microphone and speaker for voice communication, timers, a flashlight, and a visible light camera, an infrared camera, and/or others. In one embodiment, the other components 175 may include components to implement augmented-reality capability for the wearable apparatus 110.

In an embodiment, the light emitting device 120 may emit light in response to a control signal from the wearable apparatus 110 (e.g., the logic device 165 of the wearable apparatus 110) or other device. For example, the user 140 may use the wearable apparatus 110 (e.g., a button provided on a control unit of the wearable apparatus 110) or other user device (e.g., a mobile phone of the user 140) to transmit a control signal to the light emitting device 120 and the shutter device 160 to cause the light emitting device 120 to emit a light signal and the shutter device 160 to process (e.g., mitigate by blocking or attenuating) the light signal appropriately to prevent harm to the user 140.

It is noted that the aerial vehicle 105 and the wearable apparatus 110 may have fewer components, more components, and/or different components from that shown in FIG. 1. As an example, in some aspects, the aerial vehicle 105 does not include an onboard sensor for capturing images. In such aspects, the aerial vehicle 105 (e.g., the logic device 130 of the aerial vehicle 105) may receive image data from the wearable apparatus 110 and/or other device (e.g., a camera associated with at least the aerial vehicle 105) and process the image data to identify any objects of interest.

Furthermore, although the wearable apparatus 110 is shown as a device worn at least over a face of the user 140, in some embodiments a wearable apparatus may be cover a smaller portion of the face of the user 140. In an aspect, a wearable apparatus may be used to cover primarily the eyes of the user 140. For example, the wearable apparatus may include glasses or goggles. In one case, these glasses or goggles may include a shield and a shutter device disposed thereon. In another case, these glasses or goggles may include a shutter device (e.g., without a separate shield).

Figure 2:
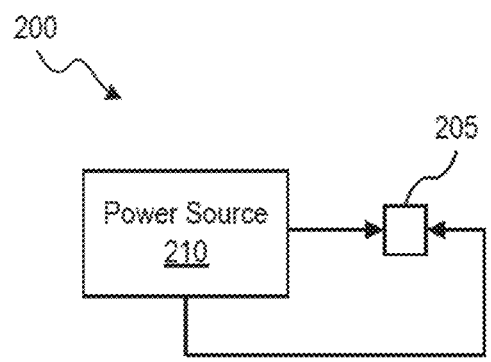
FIG. 2 illustrates an example shutter device according to one or more embodiments of the present disclosure.

FIG. 2 illustrates an example shutter device 200 according to one or more embodiments of the present disclosure. The shutter device 200 includes a shutter 205 and a power source 210. In an embodiment, the shutter device 200 may be, may include, or may be a part of the shutter device 160 of FIG. 1. The shutter 205 may be, or may include, an optical coating. The optical coating may be in front of the shield 145 (e.g., a side of the shield 145 closer to the external environment), behind the shield 145, or substantially coplanar with the shield 145 (e.g., the shield 145 may have a hole/slot within which to fit the shutter 205). The optical coating may be a phase change material that can turn opaque to block light of a certain wavelength and turn translucent to allow light through. The optical coating may turn opaque or translucent by varying an electrical signal (e.g., a voltage) applied to the shutter 205 by the power source 210. The power source 210 may be controlled by a control signal from the logic device 165.

Figure 3:
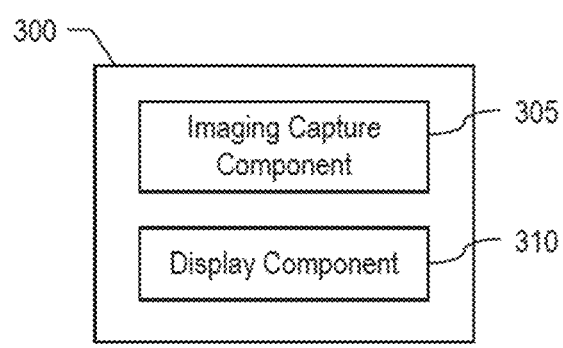
FIG. 3 illustrates a block diagram of an example set of components for a wearable apparatus in accordance with one or more embodiments of the present disclosure.

In some embodiments, the wearable apparatus 110 may be, may include, or may be a part of, an augmented-reality headset. For example, FIG. 3 illustrates a block diagram of an example set 300 of components that may form the other components 175 of the wearable apparatus 110 of FIG. 1 for providing an augmented-reality headset in accordance with one or more embodiments of the present disclosure. The set 300 of components includes an imaging capture component 305 and a display component 310. The imaging capture component 305 captures images of a scene and provides the images to a processing circuit for processing. For explanatory purposes, the logic device 165 may include the processing circuit. The imaging capture component 305 may include visible-light image sensors, IR image sensors, and/or image sensors for capturing EM radiation of other wavelengths. It is noted that the wearable apparatus 110 may include no imaging capture components and may instead receive images from remote imaging capture components that communicate with the wearable apparatus 110.

The logic device 165 may process and/or otherwise manages images captured by the imaging capture component 305 (and/or other imaging capture components). In one embodiment, the logic device 165 may receive images (e.g., visible-light images, thermal images) captured by the imaging capture component 305 and process the images to generate user-viewable images (e.g., such as thermograms based on captured thermal images) of the external environment. As an example, the user-viewable images may be visible-light representations of captured thermal images. The user-viewable images may be provided by the logic device 165 to the display component 310 to facilitate viewing of the user-viewable images by the user 140. In an aspect, the logic device 165 may generate and overlay information and/or alarms (e.g., an identified target, a temperature reading, a gas detection alarm, a mask pressure reading and alarm, an oxygen tank reading and alarm, and/or others) onto the user-viewable images. In some cases, the logic device 165 may receive images from the imaging capture component 305 and/or other imaging capture components and combine the images to generate stereoscopic user-viewable images (e.g., three dimensional thermograms) of the external environment therefrom.

In some aspects, processing of captured images may be distributed between the imaging capture component 305, the logic device 165, the display component 310, and/or other components. For example, in some cases, the logic device 165 and/or the imaging capture component 305 may perform automatic exposure control (e.g., by controlling signal gain, camera aperture, and/or shutter speed) on the imaging capture component 305 to adjust to changes in the infrared intensity and temperature level of the external environment.

The display component 310 receives user-viewable images from the logic device 165 and facilitates viewing of user-viewable images by the user 140. The logic device 165 may transmit the user-viewable images to the display component 310 via wired and/or wireless communication. The user-viewable images may form a recording of the scene (e.g., the environment external to the wearable apparatus 110). In an embodiment, the display component 310 may provide a screen (e.g., a digital screen/display) that displays the recording of the scene to the user 140 such that the user 140 does not see the scene directly. In some aspects of such an embodiment, the display component 310 may implement, at least in part, the shutter device 160. The display component 310 may filter out a bright scene to preserve a dark-adaptation, or may filter out a dark scene to see the details in a brightly lit room (or a dimmed version thereof). In some cases, a shutter (e.g., an electronic shutter) of cameras filming the scene (and/or other parts of the world) may be synchronized with light emitted by the light emitting device 120. In such cases, the data provided by the logic device 130 of the aerial vehicle 105 may be transmitted to the wearable apparatus 110 as well as these cameras.

In some aspects, when the shutter device 160 is closed, the user 140 may see (e.g., may be presented with) a previously captured image. In some cases, a digital display may show a sequence of still images. The still images may be refreshed sufficiently fast to provide fluid motion. The user 140 may see a video where images on the screen update at a same frequency as a flash (e.g., around 10 Hz refresh rate). Image data associated with the scene may be brightened, dimmed, or otherwise processed prior to being presented to the user 140. For instance, whether the image is a bright version or a dark version of the scene may depend on how the shutter device 160 is configured (e.g., by the user 140, another user/operator, a manufacturer of the wearable apparatus 110, etc. and generally dependent on application). As one example, the shutter device 160 can be open when the light emitting device 120 is emitting light (e.g., the flash is on) and closed when the light emitting device 120 is not emitting light (e.g., the flash is off). As another example, the shutter device 160 can be closed when the light emitting device 120 is emitting light (e.g., the flash is on) and open when the light emitting device 120 is not emitting light (e.g., the flash is off). As another example, the shutter device 160 may be open only during parts of the flash for some applications. The shutter device 160 may be operated in such a manner to adjust an exposure time on a sensor without modifying a pulse length of the flash (e.g., requires a global shutter sensor) for example.

In various embodiments, the display component 310 and/or the logic device 165 may perform distortion correction of user-viewable images. The display component 310 may optically correct distortion using optical elements such as lenses, prisms, and mirrors. In some cases, the display component 310 may provide two or more beams to present stereoscopic user-viewable images of the external environment to the user 140. In some aspects, the display component 310 may be implemented with a projector, such as any appropriate small form factor projector. In various embodiments, the projector may be implemented in accordance with various technologies such as digital light processing (DLP), liquid crystal on silicon (LCoS), laser beam steering (LBS), holographic laser projection (HLP), and/or others as appropriate. In one example, the display component 310 may project three-dimensional user-viewable images using HLP technology. In embodiments in which the projector is implemented with HLP technology, distortion may be corrected through appropriate operations performed by the projector and/or the logic device 165. In this regard, such HLP technology may implement holographic processes to generate interference or diffraction patterns of an image instead of the image itself, and focused laser beams may be projected through such interference patterns to direct light as desired without relying on optical elements.

The communication component 170 may handle communication between the imaging capture component 305, the logic device 165, and the display component 310, such that these components may transmit data to and receive data from each other via the communication component 170. The communication component 170 may facilitate wired and/or wireless connections. By way of non-limiting examples, such connections may be provided using inter-chip connections, intra-chip connections, proprietary RF links, and/or standard wireless communication protocols (e.g., IEEE 802.11 WiFi standards, and Bluetooth™) between the various components.

Figure 4:
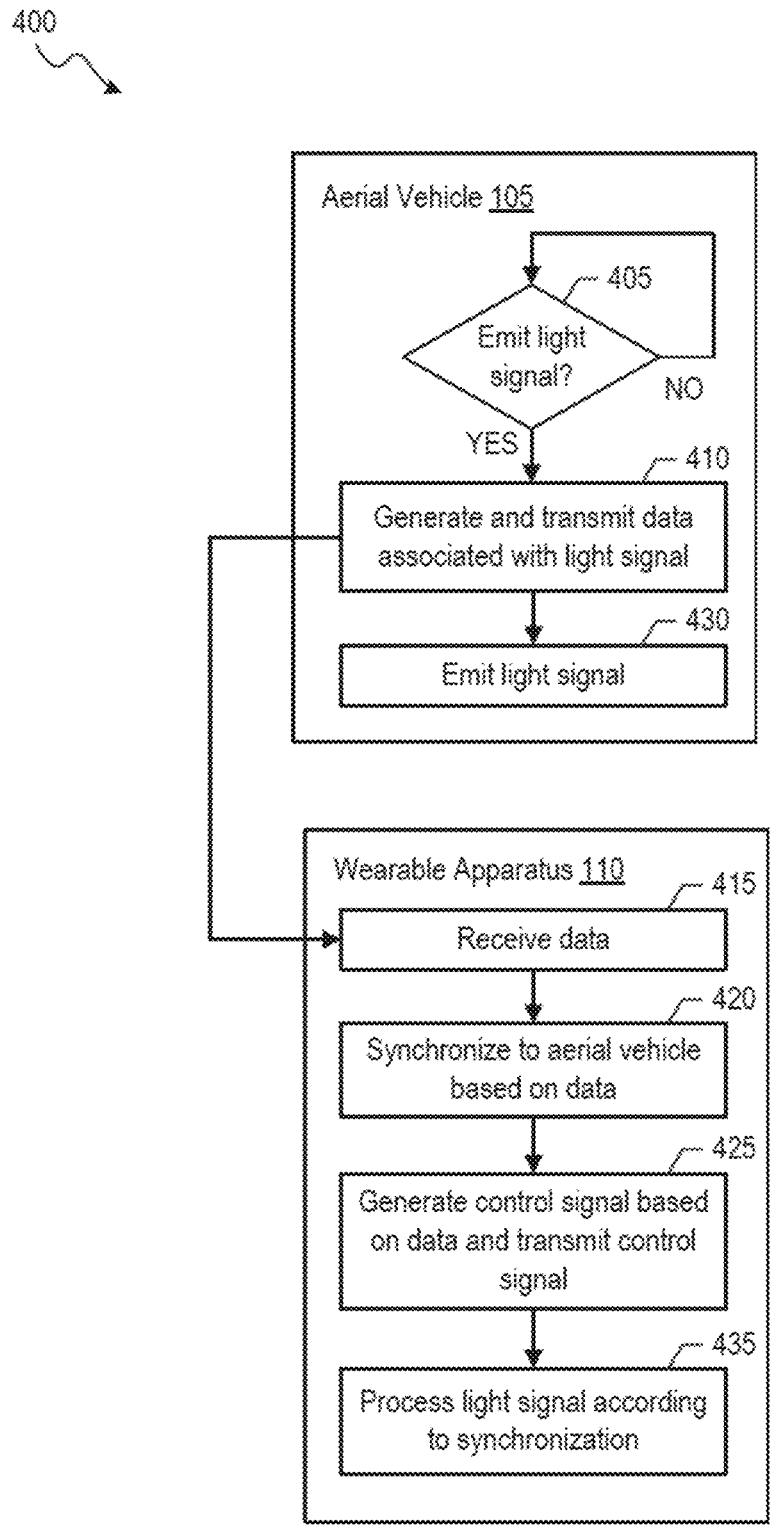
FIG. 4 illustrates an example process for facilitating shutter and light signal synchronization in accordance with one or more embodiments of the present disclosure.

FIG. 4 illustrates an example process 400 for facilitating shutter and light signal synchronization in accordance with one or more embodiments of the present disclosure. Although the process 400 is primarily described herein with reference to the environment 100 of FIG. 1 for explanatory purposes, the process 400 can be performed in relation to other environments. Note that one or more operations in FIG. 4 may be combined, omitted, and/or performed in a different order as desired.

At block 405, the logic device 165 determines whether to emit a light signal. In one aspect, the logic device 165 may determine to emit a light signal in response to detecting a target (e.g., possible threat). For example, the target may be detected using object recognition, radar, sonar, and/or other techniques. Detection of objects of interest (e.g., potential targets) and/or classification of each detected object as a target may be performed by the aerial vehicle 105 and/or other devices. For example, the detection may be performed using an onboard sensor(s) (e.g., camera(s), radar(s)) of the aerial vehicle 105 and/or a sensor(s) of other devices and/or vehicles, and/or the classification may be performed using the logic device 165 and/or a logic device of other devices and/or vehicles. In some cases, data associated with an identified target, such as image data of the target, may be provided to the user 140 of the wearable apparatus 110 to allow the user 140 to instruct the logic device 165 to cause or not cause emission of a light signal at a target. In another aspect, the logic device 165 may determine to emit a light signal in response to an instruction from a user (e.g., the user 140) to emit a light signal. In some cases, the aerial vehicle 105 may be used to scout a path ahead.

If the determination at block 405 is not to emit the light signal, the process 400 remains at block 405. The light emitting device 120 generally remains off until a control signal is provided to the light emitting device 120 to cause the light emitting device 120 to emit a light signal. For some applications, keeping the light emitting device 120 turned off may help avoid possible threats adapting to light signals emitted by the light emitting device 120 and/or avoid unnecessarily revealing a position of the aerial vehicle 105.

If the determination at block 405 is to emit the light signal, the process 400 proceeds to block 410. At block 410, the logic device 130 of the aerial vehicle 105 generates and transmits data associated with the light signal to be emitted by the light emitting device 120 to the light emitting device 120 and the wearable apparatus 110. The data may be wirelessly transmitted from the aerial vehicle 105 to the wearable apparatus 110. The data synchronizes operation of the light emitting device 120 with operation of the shutter device 160 of the wearable apparatus 110. In an aspect, the data may characterize the light signal to be emitted by the light emitting device 120. By way of non-limiting examples, a light signal emitted by the light emitting device 120 may be characterized by a time interval between any two pulses of the light signal, a time duration of each pulse, a light intensity of each pulse, and/or a wavelength of each pulse.

In an aspect, the data associated with the light signal may be incorporated into one or more control signals. The light emitting device 120 and the wearable apparatus 110 may receive the same control signal or may receive different control signals (e.g., containing the same or similar information). In some cases, the data transmitted to the light emitting device 120 may be different (e.g., different in format and/or content) from the data transmitted to the wearable apparatus 110. In some cases, the data transmitted to the light emitting device 120 may be more detailed than the data transmitted to the wearable apparatus 110. For example, the data transmitted to the light emitting device 120 may indicate a wavelength of the light signal to be emitted, whereas the data transmitted to the wearable apparatus 110 might not indicate the wavelength. In this example, the data transmitted to the light emitting device 120 may more fully characterize the light signal to be emitted by the light emitting device 120, whereas the data transmitted to the wearable apparatus 110 may be less detailed but sufficient to allow the wearable apparatus 110 to protect the user 140 from the light signal. In some cases of this example, the wearable apparatus 110 may be used to operate with light signals of a certain wavelength (e.g., and thus does not need to be informed of the wavelength of the light signal) and the light emitting device 120 is configured to specifically operate with the wearable apparatus 110.

At block 415, the logic device 165 of the wearable apparatus 110 receives the data from the aerial vehicle 105. At block 420, the shutter device 160 of the wearable apparatus 110 and the light emitting device 120 of the aerial vehicle 105 are synchronized based on the data. In an aspect, such synchronization may be referred to as synchronizing an operation of the shutter device 160 with an operation of the light emitting device 120, synchronizing the shutter device 160 to the light signal, synchronizing the shutter device 160 with the light emitting device 120 in association with the light signal, or variants thereof. At block 425, the logic device 165 generates a control signal for the shutter device 160 based on the data received from the aerial vehicle 105 and transmits the control signal to the shutter device 160. At block 430, the light emitting device 120 emits the light signal. In some cases, the aerial vehicle 105 may move to an appropriate position (e.g., between the user 140 and the target 135 or a field of view of the target 135) at which to emit the light signal.

At block 435, the shutter device 160 processes the light signal according to the synchronization of the shutter device 160 and the light emitting device 120. Such processing may be performed to mitigate the light signal such that the light signal does not harm the user 140 (e.g., harm the eyesight of the user 140). In some cases, the control signal indicates to the shutter device 160 time instances (e.g., synchronized with flashes of the light signal) to close the shutter device 160 to block the light signal. In some cases, the shutter device 160 and/or other device may process image data associated with a scene that encompasses the light signal and a background scene. Such processing may include the processing the light signal at block 435 as well as processing the image data associated with the background scene (e.g., filter out the background scene, dim the background scene, brighten the background scene).

As one example, the shutter device 160 may include a mechanical shutter that can be closed in response to a control signal from the logic device 165. As another example, the shutter device 160 may include an optical coating and a power source that, in response to the control signal from the logic device 165, applies an electrical signal to the optical coating to cause the optical coating to turn from translucent to opaque to block the light signal. In a case that the wearable apparatus 110 is an augmented-reality headset, the control signal from the logic device 165 may cause appropriate processing to be applied to captured image data such that the light signal is removed or attenuated. In such a case, the logic device 130 of the aerial vehicle 105 and/or the logic device 165 of the wearable apparatus 110 may send data to an imaging sensor(s) filming the scene to cause the imaging sensor(s) to synchronize the imaging sensor(s) to the light signal to be emitted by the light emitting device 120. Such synchronization may facilitate capture and/or processing (e.g., blocking, filtering) of the light signal by the imaging sensor(s) such that the light signal is not directly shown to the user 140.

Although the foregoing describes example embodiments in which control signals are provided to a light emitting device (e.g., 120) to cause the light emitting device to emit a light signal, in other embodiments the light emitting device may emit a light signal until otherwise instructed by a control signal. For example, at a start of a scouting application, the light emitting device may receive a control signal to emit a light signal (e.g., and in some cases characteristics of the light signal to be emitted). During the scouting application, the light emitting device may continue to emit the light signal until a new control signal is received by the light emitting device to emit a different light signal or to stop emitting a light signal.

Figure 5:
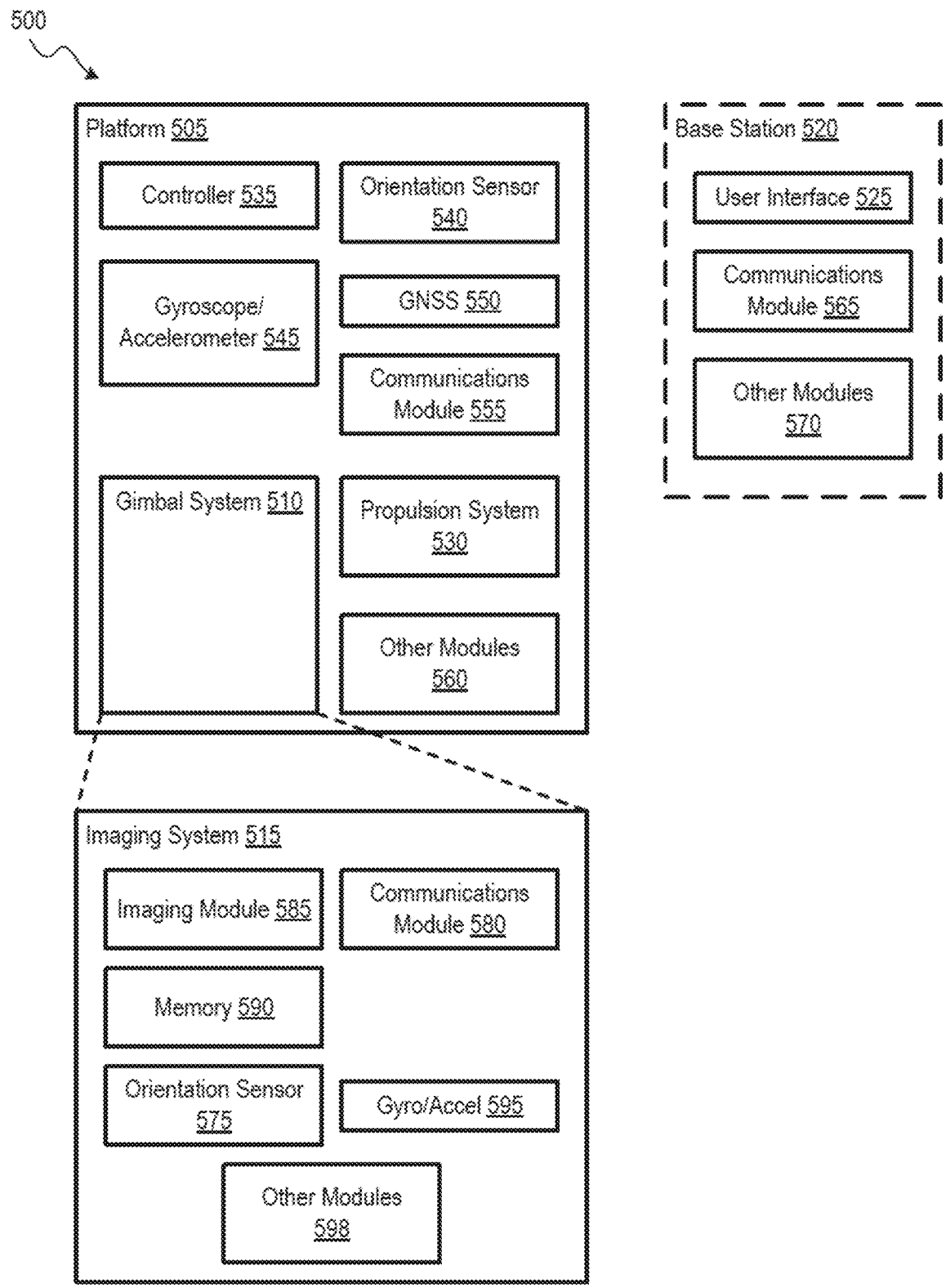
FIG. 5 illustrates a block diagram of a vehicle system in accordance with one or more embodiments of the present disclosure.

FIG. 5 illustrates a block diagram of a vehicle system 500 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 500 includes a mobile platform 505, in accordance with an embodiment of the disclosure. In an embodiment, the mobile platform 505 may be, may include, or may be a part of, the aerial vehicle 105 of FIG. 1. In various embodiments, the system 500 and/or elements of the system 500 may be configured to fly over a scene or survey area, to fly through a structure, or to approach a target and image or sense the scene, structure, or target, or portions thereof, using a gimbal system 510 to aim an imaging system/sensor payload 515 at the scene, structure, or target, or portions thereof, for example. Resulting imagery and/or other sensor data may be processed (e.g., by the sensor payload 515, the mobile platform 505, and/or a base station 520) and displayed to a user through use of a user interface 525 (e.g., one or more displays such as a multi-function display (MFD), a portable electronic device such as a tablet, laptop, or smart phone, or other appropriate interface) and/or stored in memory for later viewing and/or analysis. The base station 520 may be optional. In some embodiments, the system 500 may be configured to use such imagery and/or sensor data to control operation of the mobile platform 505 and/or the sensor payload 515, as described herein, such as controlling the gimbal system 510 to aim the sensor payload 515 towards a particular direction, or controlling a propulsion system 530 to move the mobile platform 505 to a desired position in a scene or structure or relative to a target.

In the embodiment shown in FIG. 5, the system 500 includes the mobile platform 505, base station 520, and at least one imaging system/sensor payload 515. The mobile platform 505 may be implemented as a mobile platform configured to move or fly and position and/or aim the sensor payload 515 (e.g., relative to a designated or detected target). As shown in FIG. 5, the mobile platform 505 may include one or more of a controller 535, an orientation sensor 540, a gyroscope/accelerometer 545, a global navigation satellite system (GNSS) 550, a communications module 555, the gimbal system 510, the propulsion system 530, and other modules 560. Operation of the mobile platform 505 may be substantially autonomous and/or partially or completely controlled by the base station 520, which may include one or more of the user interface 525, a communications module 565, and other modules 570. In other embodiments, the mobile platform 505 may include one or more of the elements of the base station 520, such as with various types of manned aircraft, terrestrial vehicles, and/or surface or subsurface watercraft. The sensor payload 515 may be physically coupled to the mobile platform 505 and be configured to capture sensor data (e.g., visible spectrum images, infrared images, narrow aperture radar data, and/or other sensor data) of a target position, area, and/or object(s) as selected and/or framed by operation of the mobile platform 505 and/or base station 520. In some embodiments, one or more of the elements of the system 500 may be implemented in a combined housing or structure that can be coupled to or within the mobile platform 505 and/or held or carried by a user of the system 500.

The controller 535 may be implemented as any appropriate logic device (e.g., processing device, microcontroller, processor, ASIC, FPGA, memory storage device, memory reader, or other device or combinations of devices) that may be adapted to execute, store, and/or receive appropriate instructions, such as software instructions implementing a control loop for controlling various operations of the mobile platform 505 and/or other elements of the system 500, such as the gimbal system 510, for example. Such software instructions may also implement methods for processing images (e.g., to facilitate object recognition) and/or other sensor signals, determining sensor information, providing user feedback (e.g., through the user interface 525), querying devices for operational parameters, selecting operational parameters for devices, or performing any of the various operations described herein (e.g., operations performed by logic devices of various elements of the system 500).

In addition, a non-transitory medium may be provided for storing machine readable instructions for loading into and execution by the controller 535. In these and other embodiments, the controller 535 may be implemented with other components where appropriate, such as volatile memory, non-volatile memory, one or more interfaces, and/or various analog and/or digital components for interfacing with devices of the system 500. For example, the controller 535 may be adapted to store sensor signals, sensor information, parameters for coordinate frame transformations, calibration parameters, sets of calibration points, and/or other operational parameters, over time, for example, and provide such stored data to a user using the user interface 525. In some embodiments, the controller 535 may be integrated with one or more other elements of the mobile platform 505, for example, or distributed as multiple logic devices within the mobile platform 505, base station 520, and/or sensor payload 515.

In some embodiments, the controller 535 may be configured to substantially continuously monitor and/or store the status of and/or sensor data provided by one or more elements of the mobile platform 505, sensor payload 515, and/or base station 520, such as the position and/or orientation of the mobile platform 505, sensor payload 515, and/or base station 520, for example. In various embodiments, sensor data may be monitored and/or stored by the controller 535 and/or processed or transmitted between elements of the system 500 substantially continuously throughout operation of the system 500, where such data includes various types of sensor data, control parameters, and/or other data, as described herein.

An orientation sensor 575 may be implemented as one or more of a compass, float, accelerometer, and/or other device capable of measuring an orientation of the mobile platform 505 (e.g., magnitude and direction of roll, pitch, and/or yaw, relative to one or more reference orientations such as gravity and/or Magnetic North), gimbal system 510, imaging system/sensor payload 515, and/or other elements of the system 500, and providing such measurements as sensor signals and/or data that may be communicated to various devices of the system 500. The gyroscope/accelerometer 545 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the mobile platform 505 and/or other elements of the system 500 and providing such measurements as sensor signals and/or data that may be communicated to other devices of the system 500 (e.g., user interface 525, controller 535). The GNSS 550 may be implemented according to any global navigation satellite system, including a GPS, GLONASS, and/or Galileo based receiver and/or other device capable of determining absolute and/or relative position of the mobile platform 505 (e.g., or an element of the mobile platform 505) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the system 500. In some embodiments, the GNSS 550 may include an altimeter, for example, or may be used to provide an absolute altitude.

The communications module 555 may be implemented as any wired and/or wireless communications module configured to transmit and receive analog and/or digital signals between elements of the system 500. For example, the communications module 555 may be configured to receive flight control signals and/or data from the base station 520 and provide them to the controller 535 and/or propulsion system 530. In other embodiments, the communications module 555 may be configured to receive images and/or other sensor information (e.g., visible spectrum and/or infrared still images or video images) from the sensor payload 515 and relay the sensor data to the controller 535 and/or base station 520. In some embodiments, the communications module 555 may be configured to support spread spectrum transmissions, for example, and/or multiple simultaneous communications channels between elements of the system 500. Wireless communication links may include one or more analog and/or digital radio communication links, such as Wi-Fi and others, as described herein, and may be direct communication links established between elements of the system 500, for example, or may be relayed through one or more wireless relay stations configured to receive and retransmit wireless communications. Communication links established by the communication module 555 may be configured to transmit data between elements of the system 500 substantially continuously throughout operation of the system 500, where such data includes various types of sensor data, control parameters, and/or other data, as described herein.

The gimbal system 510 may be implemented as an actuated gimbal mount, for example, that may be controlled by the controller 535 to stabilize the sensor payload 515 relative to a target or to aim the sensor payload 515 or components coupled thereto according to a desired direction and/or relative orientation or position. As such, the gimbal system 510 may be configured to provide a relative orientation of the sensor payload 515 (e.g., relative to an orientation of the mobile platform 505) to the controller 535 and/or communications module 555 (e.g., the gimbal system 510 may include its own the orientation sensor 575). In other embodiments, the gimbal system 510 may be implemented as a gravity driven mount (e.g., non-actuated). In various embodiments, the gimbal system 510 may be configured to provide power, support wired communications, and/or otherwise facilitate operation of the articulated sensor/sensor payload 515. In further embodiments, the gimbal system 510 may be configured to couple to a laser pointer, range finder, and/or other device, for example, to support, stabilise, power, and/or aim multiple devices (e.g., sensor payload 515 and one or more other devices) substantially simultaneously.

In some embodiments, the gimbal system 510 may be adapted to rotate the sensor payload 515 +/−90 degrees, or up to 360 degrees, in a vertical plane relative to an orientation and/or position of the mobile platform 505. In further embodiments, the gimbal system 510 may rotate the sensor payload 515 to be parallel to a longitudinal axis or a lateral axis of the mobile platform 505 as the mobile platform 505 yaws, which may provide 360 degree ranging and/or imaging in a horizontal plane relative to the mobile platform 505. In various embodiments, the controller 535 may be configured to monitor an orientation of the gimbal system 510 and/or sensor payload 515 relative to the mobile platform 505, for example, or an absolute or relative orientation of an element of the sensor payload 515. Such orientation data may be transmitted to other elements of the system 500 for monitoring, storage, or further processing, as described herein.

The other modules 560 may include other and/or additional sensors, actuators, communications modules/nodes, and/or user interface devices, for example, and may be used to provide additional environmental information related to operation of the mobile platform 505, for example. In some embodiments, the other modules 560 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the system 500 (e.g., the controller 535) to provide operational control of the mobile platform 505 and/or system 500.

In some embodiments, the other modules 560 may include one or more actuated and/or articulated devices (e.g., multi-spectrum active illuminators, visible and/or IR cameras, radars, sonars, and/or other actuated devices) coupled to the mobile platform 505, where each actuated device includes one or more actuators adapted to adjust an orientation of the device, relative to the mobile platform 505, in response to one or more control signals (e.g., provided by the controller 535). In particular, the other modules 560 may include a stereo vision system configured to provide image data that may be used to calculate or estimate a position of the mobile platform 505, for example, or to calculate or estimate a relative position of a navigational hazard in proximity to the mobile platform 505. In various embodiments, the controller 535 may be configured to use such proximity and/or position information to help safely pilot the mobile platform 505 and/or monitor communication link quality, as described herein.

The user interface 525 of the base station 520 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 525 may be adapted to provide user input (e.g., as a type of signal and/or sensor information transmitted by the communications module 565 of the base station 520) to other devices of the system 500, such as the controller 535. The user interface 525 may also be implemented with one or more logic devices (e.g., similar to the controller 535) that may be adapted to store and/or execute instructions, such as software instructions, implementing any of the various processes and/or methods described herein. For example, the user interface 525 may be adapted to form communication links, transmit and/or receive communications (e.g., infrared images and/or other sensor signals, control signals, sensor information, user input, and/or other information), for example, or to perform various other processes and/or methods described herein.

In one embodiment, the user interface 525 may be adapted to display a time series of various sensor information and/or other parameters as part of or overlaid on a graph or map, which may be referenced to a position and/or orientation of the mobile platform 505 and/or other elements of the system 500. For example, the user interface 525 may be adapted to display a time series of positions, headings, and/or orientations of the mobile platform 505 and/or other elements of the system 500 overlaid on a geographical map, which may include one or more graphs indicating a corresponding time series of actuator control signals, sensor information, and/or other sensor and/or control signals.

In some embodiments, the user interface 525 may be adapted to accept user input including a user-defined target heading, waypoint, route, and/or orientation for an element of the system 500, for example, and to generate control signals to cause the mobile platform 505 to move according to the target heading, route, and/or orientation, or to aim the sensor payload 515 accordingly. In other embodiments, the user interface 525 may be adapted to accept user input modifying a control loop parameter of the controller 535, for example. In further embodiments, the user interface 525 may be adapted to accept user input including a user-defined target attitude, orientation, and/or position for an actuated or articulated device (e.g., the sensor payload 515) associated with the mobile platform 505, for example, and to generate control signals for adjusting an orientation and/or a position of the actuated device according to the target altitude, orientation, and/or position. Such control signals may be transmitted to the controller 535 (e.g., using the communications modules 565 and 555), which may then control the mobile platform 505 accordingly.

The communications module 565 may be implemented as any wired and/or wireless communications module configured to transmit and receive analog and/or digital signals between elements of the system 500. For example, the communications module 565 may be configured to transmit flight control signals from the user interface 525 to the communications module 555 and 580. In other embodiments, the communications module 565 may be configured to receive sensor data (e.g., visible spectrum and/or infrared still images or video images, or other sensor data) from the sensor payload 515. In some embodiments, the communications module 565 may be configured to support spread spectrum transmissions, for example, and/or multiple simultaneous communications channels between elements of the system 500. In various embodiments, the communications module 565 may be configured to monitor the status of a communication link established between the base station 520, sensor payload 515, and/or mobile platform 505 (e.g., including packet loss of transmitted and received data between elements of the system 500, such as with digital communication links), as described herein. Such status information may be provided to the user interface 525, for example, or transmitted to other elements of the system 500 for monitoring, storage, or further processing, as described herein.

The other modules 570 of the base station 520 may include other and/or additional sensors, actuators, communications modules/nodes, and/or user interface devices used to provide additional environmental information associated with the base station 520, for example. In some embodiments, the other modules 570 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the system 500 (e.g., the controller 535) to provide operational control of the mobile platform 505 and/or system 500 or to process sensor data to compensate for environmental conditions, such as a water content in the atmosphere approximately at the same altitude and/or within the same area as the mobile platform 505 and/or base station 520, for example. In some embodiments, the other modules 570 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 525).

In embodiments where the imaging system/sensor payload 515 is implemented as an imaging device, the imaging system/sensor payload 515 may include an imaging module 585, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 585 may include one or more logic devices (e.g., similar to the controller 535) that can be configured to process imagery captured by detector elements of the imaging module 585 before providing the imagery to a memory 590 or communications module 580. More generally, the imaging module 585 may be configured to perform any of the operations or methods described herein, at least in part, or in combination with the controller 535 and/or user interface 525.

In some embodiments, the sensor payload 515 may be implemented with a second or additional imaging modules similar to the imaging module 585, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 585 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communications module 580 of the sensor payload 515 may be implemented as any wired and/or wireless communications module configured to transmit and receive analog and/or digital signals between elements of the system 500. For example, the communications module 580 may be configured to transmit infrared images from the imaging module 585 to the communications module 555 or 565. As another example, the communications module 580 may be configured to transmit measurement ranges to the communications module 555 or 565. In other embodiments, the communications module 580 may be configured to receive control signals (e.g., control signals directing capture, focus, selective filtering, and/or other operation of the sensor payload 515) from the controller 535 and/or user interface 525. In some embodiments, the communications module 580 may be configured to support spread spectrum transmissions, for example, and/or multiple simultaneous communications channels between elements of the system 500. In various embodiments, the communications module 580 may be configured to monitor and communicate the status of an orientation of the sensor payload 515 as described herein. Such status information may be provided or transmitted to other elements of the system 500 for monitoring, storage, or further processing, as described herein.

The memory 590 may be implemented as one or more machine readable mediums and/or logic devices configured to store software instructions, sensor signals, control signals, operational parameters, calibration parameters, infrared images, and/or other data facilitating operation of the system 500, for example, and provide it to various elements of the system 500. The memory 590 may also be implemented, at least in part, as removable memory, such as a secure digital memory card for example including an interface for such memory.

The orientation sensor 575 of the sensor payload 515 may be implemented similar to the orientation sensor 540 or gyroscope/accelerometer 545, and/or any other device capable of measuring an orientation of the sensor payload 515, imaging module 585, and/or other elements of the sensor payload 515 (e.g., magnitude and direction of roll, pitch, and/or yaw, relative to one or more reference orientations such as gravity, Magnetic North, and/or an orientation of the mobile platform 505) and providing such measurements as sensor signals that may be communicated to various devices of the system 500. A gyroscope/accelerometer (e.g., angular motion sensor) 595 of the sensor payload 515 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 515 and/or various elements of the sensor payload 515 and providing such measurements as sensor signals that may be communicated to various devices of the system 500.

Other modules 598 of the sensor payload 515 may include other and/or additional sensors, actuators, communications modules/nodes, cooled or uncooled optical filters, and/or user interface devices used to provide additional environmental information associated with the sensor payload 515, for example. In some embodiments, the other modules 598 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 585 or other devices of the system 500 (e.g., the controller 535) to provide operational control of the mobile platform 505 and/or system 500 or to process imagery to compensate for environmental conditions.

In general, each of the elements of the system 500 may be implemented with any appropriate logic device (e.g., processing device, microcontroller, processor, ASIC, FPGA, memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the system 500. In addition, one or more non-transitory mediums may be provided for storing machine readable instructions for loading into and execution by any logic device implemented with one or more of the devices of the system 500. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the system 500 using a variety of wired and/or wireless communication techniques, including voltage signaling, Ethernet, Wi-Fi, Bluetooth, Zigbee, Xbee, Micronet, or other medium and/or short range wired and/or wireless networking protocols and/or implementations, for example. In such embodiments, each element of the system 500 may include one or more modules supporting wired, wireless, and/or a combination of wired and wireless communication techniques. In some embodiments, various elements or portions of elements of the system 500 may be integrated with each other, for example, or may be integrated onto a single printed circuit board (PCB) to reduce system complexity, manufacturing costs, power requirements, coordinate frame errors, and/or timing errors between the various sensor measurements. Each element of the system 500 may include one or more batteries, capacitors, or other electrical power storage devices, for example, and may include one or more solar cell modules or other electrical power generating devices. In some embodiments, one or more of the devices may be powered by a power source for the mobile platform 505, using one or more power leads. Such power leads may also be used to support one or more communication techniques between elements of the system 500.

FIG. 6 illustrates a diagram of a survey system 600 including mobile platforms 605 and 610, each with sensor payloads 515 and associated gimbal systems 510 in accordance with one or more embodiments of the present disclosure. In an embodiment, the mobile platform 605 or 610 may be, may include, or may be a part of the aerial vehicle 105 of FIG. 1. In some aspects, the survey system 600 may be employed in the environment 100 of FIG. 1. In the embodiment shown in FIG. 6, the survey system 600 includes base station 520, mobile platform 605 with articulated imaging system/sensor payload 515 and gimbal system 510, and mobile platform 610 with articulated imaging system/sensor payload 515 and gimbal system 510, where base station 520 may be configured to control motion, position, and/or orientation of mobile platform 605, mobile platform 610, and/or sensor payloads 515. More generally, the survey system 600 may include any number of mobile platforms.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
   a vehicle comprising:
      a light emitting device configured to emit a light signal, wherein the light emitting device comprises a strobe light configured to transmit flashes of light; and
      a logic device configured to transmit data associated with the light signal, wherein the data indicates a time interval between flashes of the light signal, a time duration of a flash of the light signal, and/or an intensity of the flash of the light signal; and
   a wearable apparatus comprising a shutter device configured to synchronize with the light signal based on the data and process the light signal according to the synchronization.

2. The system of claim 1, wherein:
the logic device is further configured to:
receive image data associated with a scene;
detect, based on the image data, an object in the scene; and
generate the data in response to detecting the object; and
the light emitting device is configured to emit the light signal at the object.

3. The system of claim 2, wherein the vehicle is configured to move between the object and a wearer of the wearable apparatus prior to emitting the light signal.

4. The system of claim 1, wherein the shutter device is configured to:
receive image data associated with a scene that encompasses the light signal and a background; and
process image data associated with the background according to the synchronization.

5. The system of claim 1, wherein the shutter device comprises a display device configured to display image data associated with a scene to a wearer of the wearable apparatus.

6. The system of claim 5, wherein the wearable apparatus further comprises an imaging device configured to capture the image data.

7. The system of claim 1, wherein the shutter device is configured to process the light signal by blocking the light signal, and wherein the data indicates the time duration of the flash of the light signal.

8. The system of claim 1, wherein the shutter device is configured to process the light signal by filtering the light signal.

9. The system of claim 8, wherein the filtering comprises reducing a brightness of the light signal, and wherein the shutter device comprises a mechanical shutter or an optical coating.

10. The system of claim 1, wherein the vehicle comprises an unmanned aerial vehicle, and wherein the light signal comprises an infrared signal or a visible-light signal.

11. A method comprising:
transmitting, by a logic device of a vehicle, data associated with a light signal to a wearable apparatus;
synchronizing a shutter device of the wearable apparatus with the light signal;
emitting, by a light emitting device of the vehicle, the light signal, wherein the light emitting device comprises a strobe light, wherein the light signal comprises flashes of light, wherein the data indicates a time interval between flashes of the light signal, a time duration of a flash of the light signal, and/or an intensity of the flash of the light signal; and
processing, by the shutter device, the light signal according to the synchronizing.

12. The method of claim 11, further comprising:
receiving, by the logic device, image data associated with a scene;
detecting, based on the image data, an object in the scene; and
generating the data in response to the detecting,
wherein the light emitting device emits the light signal at the object.

13. The method of claim 12, further comprising moving the vehicle between the object and a wearer of the wearable apparatus prior to the emitting.

14. The method of claim 11, wherein the processing comprises blocking the light signal, the method further comprising displaying image data associated with a scene to a wearer of the wearable apparatus at least when the light signal is blocked by the shutter device.

15. The method of claim 11, wherein the processing comprises filtering the light signal.

16. The method of claim 15, wherein the filtering comprises amplifying the light signal, wherein the data indicates the intensity of the flash of the light signal, and wherein the light signal comprises an infrared signal and/or a visible-light signal.

17. The method of claim 11, wherein the shutter device comprises a mechanical shutter or an optical coating.

18. The method of claim 11, wherein the vehicle comprises an unmanned aerial vehicle.

19. The method of claim 11, wherein the data indicates a first time interval between a first flash of the light signal and a second flash of the light signal temporally adjacent to the first flash, wherein the data further indicates a second time interval between the second flash of the light signal and a third flash of the light signal temporally adjacent to the second flash, and wherein the first time interval is different from the second time interval.

20. The system of claim 1, wherein the data indicates a first time interval between a first flash of the light signal and a second flash of the light signal temporally adjacent to the first flash, wherein the data further indicates a second time interval between the second flash of the light signal and a third flash of the light signal temporally adjacent to the second flash, and wherein the first time interval is different from the second time interval.

* * * * *

UNITED STATES PATENT AND TRADEMARK OFFICE
CERTIFICATE OF CORRECTION

| | |
|---|---|
| PATENT NO. | : 11,683,450 B2 |
| APPLICATION NO. | : 17/336255 |
| DATED | : June 20, 2023 |
| INVENTOR(S) | : Jon Elvira Andres Lund |

It is certified that error appears in the above-identified patent and that said Letters Patent is hereby corrected as shown below:

In the Specification

In the Detailed Description:

In Column 11, Line 15, change "GP S" to --GPS--.

In Column 19, Line 24, change "stabilise" to --stabilize--.

Signed and Sealed this
Twenty-ninth Day of August, 2023

Katherine Kelly Vidal
*Director of the United States Patent and Trademark Office*